Patented Nov. 3, 1925.

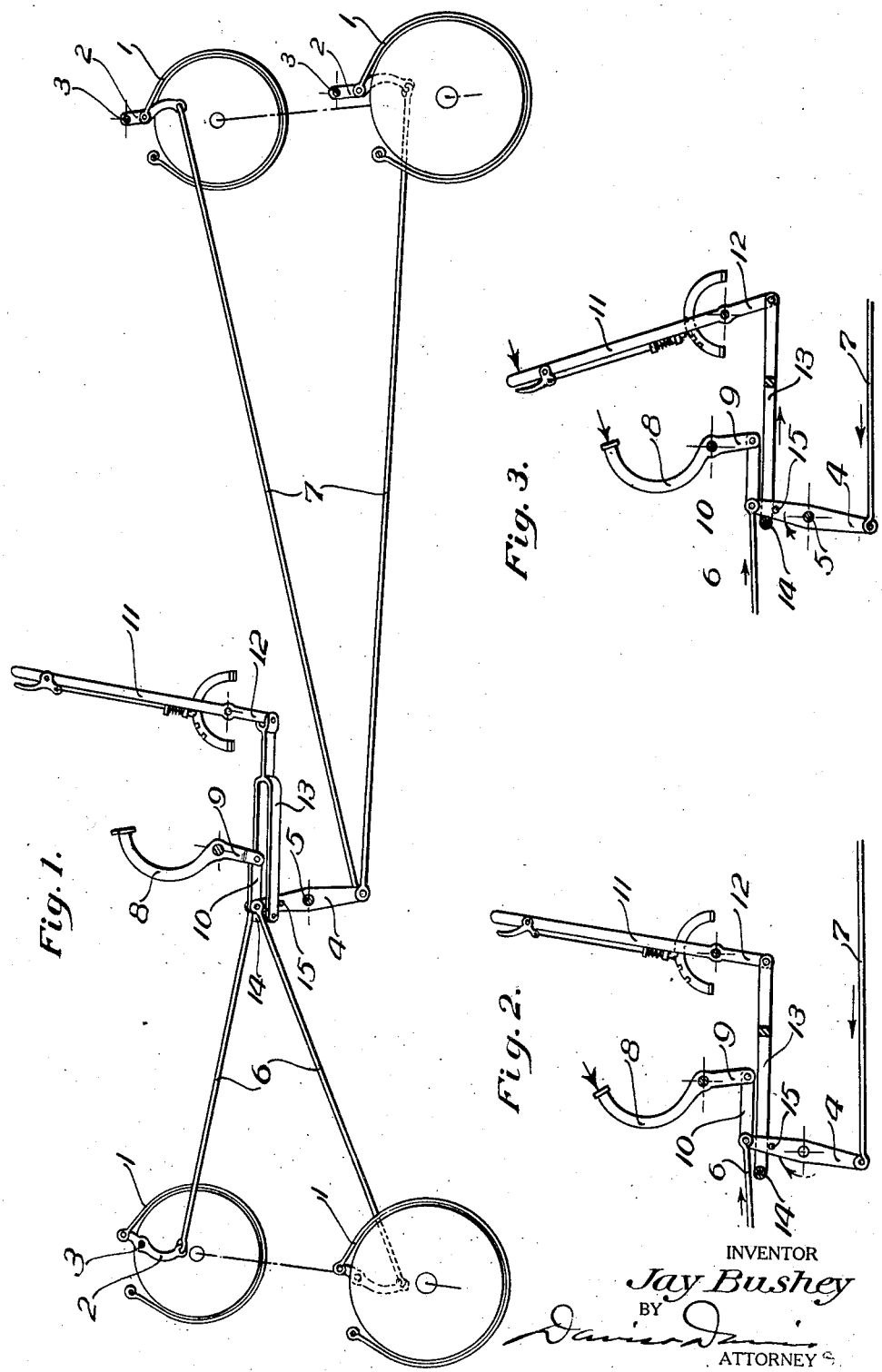

1,560,037

UNITED STATES PATENT OFFICE.

JAY BUSHEY, OF NEW YORK, N. Y.

FOUR-WHEEL BRAKE FOR AUTOMOBILES.

Application filed August 25, 1923. Serial No. 659,365.

*To all whom it may concern:*

Be it known that I, JAY BUSHEY, a citizen of the United States, and resident of the borough of Manhattan, in the city, county, and State of New York, have invented certain new and useful Improvements in Four-Wheel Brakes for Automobiles, of which the following is a specification.

In the drawings, Figure 1 is a perspective of a brake apparatus embodying the invention;

Fig. 2 a vertical sectional view showing the brake applying mechanism operated by pressure on the foot lever; and Fig. 3 a similar view showing the brake applying mechanism operated by pressure upon the foot lever and also upon the hand lever.

The main object of this invention is to provide a simple four-wheel brake mechanism by means of which the braking pressure may be applied simultaneously to the brakes of the four wheels of the vehicle.

Another object of the invention is to provide means whereby the four brakes may be simultaneously applied by means of the foot lever for ordinary or service braking.

A further object of the invention is to provide simple means by which the four brakes may be simultaneously applied by the emergency hand-operated lever or by the hand-operated lever and the foot lever.

Referring to the various parts by numerals, 1 designates the brakes applied to the four wheels of a vehicle. These brakes are illustrated as exterior band brakes, but it will of course be understood that they may be internal brakes, or of any other suitable character. Connected to the end of each brake band is a brake applying lever 2 which is pivotally connected at 3 to any suitable rigid support in the frame of the vehicle. Pivotally mounted on a suitable support in the frame of the vehicle is what may be termed a sub-lever 4 having arms of equal length on opposite sides of its pivot 5. The upper end of this sub-lever is connected by rods 6 to the brake levers 2 operating the brakes on the front wheels. The lower end of the sub-lever is connected by rods 7 to the free ends of the brake levers connected to the brake bands on the rear wheels. The rods 7, of course, may be cables or chains or any other suitable flexible, nonextensible connecting elements. Pivotally mounted in the vehicle frame, preferably in the usual position of a foot brake lever in an automobile, is a foot lever 8. The depending arm 9 of this lever is connected by a rigid link 10 to the upper end of the sublever 4. It is clear that a forward thrust on the foot lever will move the upper end of the sub-lever rearwardly and the lower end therof forwardly thereby applying all of the brakes simultaneously. Pivotally mounted in the vehicle frame in convenient reach of the operator is a hand brake lever 11, the lower arm 12 of which is connected by a yoke 13 with the upper end of the sub-lever. The sub-lever extends upwardly between the arms of the yoke 13, an end cross bar 14, connecting the ends of the arms of said yoke, being adapted to engage the forward upper edge of the sub-lever. The yoke 13 is slidingly held near the upper end of the sub-lever by pins 15 carried by the said lever. It is clear that a forward thrust on the upper end of the hand lever 11 will move the upper end of the sub-lever rearwardly, thereby applying the brakes.

As illustrated in Fig. 2, a forward thrust on the foot lever moves the upper end of the sub-lever rearwardly within the yoke 13 and the brakes are applied wholly by the pressure on the foot lever. As shown in Fig. 3, a forward thrust on the upper end of the hand lever will cause the cross bar 14 to engage the upper end of the sub-lever and force it rearwardly thereby applying the brakes. If desired the foot lever may be forced forwardly to add its power to the brakes and the brakes will then be applied by the power exerted through both levers.

The brakes may be applied for ordinary service through the operation of the foot lever. For emergency braking, however, the hand lever is used. If desired both the hand lever and the foot lever may be operated in order to secure a powerful application of the brakes in emergencies.

It is manifest that any suitable form of lost-motion connection may be employed between the hand lever and the sub-lever in order to permit the brakes to be applied through the foot lever and without moving the hand lever.

What I claim is:

1. A four wheel brake for automobiles comprising a brake adapted to be applied to each wheel, a foot lever, a hand lever, a sub-lever pivoted intermediate its ends, operative connections between the opposite ends of said sub-lever and the front and rear wheel brakes respectively, means connecting the foot lever to the sub-lever, and a lost motion connection between the hand lever and the sub-lever, whereby power may be applied to the sub-lever through the foot lever alone for operating all four brakes or simultaneously through the foot lever and the hand lever.

2. A four wheel brake apparatus for automobiles comprising a brake adapted to be applied to each wheel, a foot lever, a hand lever, a sub-lever, operative connections between the sub-lever and all of the brakes, an operative connection between the foot lever and the sub-lever, and an operative connection between the hand lever and the sub-lever, said operative connections adapting all of the brakes to be applied simultaneously through the operation of the sub-lever by the foot lever alone or by the foot lever and hand lever combined.

3. A four wheel brake apparatus for automobiles comprising a brake adapted to be applied to each wheel, a foot lever, a hand lever, a sub-lever having arms of equal length, operative connections between the opposite ends of the sub-lever and the front and rear wheel brakes respectively, an operative connection between the foot lever and the sub-lever and an operative connection between the hand lever and the sub-lever, said operative connections adapting the brakes to be applied through the operation of the sub-lever by the foot lever alone or by the foot lever and hand lever combined.

In testimony whereof I hereunto affix my signature.

JAY BUSHEY.